(12) United States Patent
Choi et al.

(10) Patent No.: US 9,080,665 B2
(45) Date of Patent: Jul. 14, 2015

(54) FAILSAFE DEVICE AND CONTROL METHOD FOR VEHICLE

(71) Applicant: Hyundai Motor Company, Seoul (KR)

(72) Inventors: Byoung Hoon Choi, Seongnam-si (KR); Dong Soo Shim, Cheonan-si (KR); Jae Shin Yi, Suwon-si (KR); Seung Ki Kong, Hwaseong-si (KR); Hak Sung Lee, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 98 days.

(21) Appl. No.: 13/973,569

(22) Filed: Aug. 22, 2013

(65) Prior Publication Data

US 2014/0343808 A1     Nov. 20, 2014

(30) Foreign Application Priority Data

May 20, 2013   (KR) .................. 10-2013-0056605

(51) Int. Cl.
*F16H 57/04* (2010.01)
*F16H 61/00* (2006.01)

(52) U.S. Cl.
CPC ........ *F16H 57/0442* (2013.01); *F16H 61/0031* (2013.01)

(58) Field of Classification Search
CPC . B60W 20/50; B60W 50/02; B60W 50/0205; B60W 50/023; B60W 50/029; B60W 2050/021; B60W 2050/022; B60W 2050/0292; B60W 2050/0295; F16H 61/12; F16H 2061/122; F16H 2061/1224; F16H 2061/1232; F16H 2061/1236; F16H 2061/1252; F16H 2061/1264; F16H 2061/1268; F16H 2061/1288; F16H 2061/1292; F16H 2061/1296; F16H 57/0435; F16H 57/0436; F16H 57/0439
See application file for complete search history.

(56) References Cited

U.S. PATENT DOCUMENTS

| | | | | |
|---|---|---|---|---|
| 5,170,343 | A | * | 12/1992 | Matsuda .................... 700/79 |
| 2004/0248685 | A1 | * | 12/2004 | Yi .............................. 475/119 |
| 2005/0266959 | A1 | * | 12/2005 | Nozaki et al. ............. 477/130 |
| 2006/0030446 | A1 | * | 2/2006 | Nozaki et al. ............. 475/119 |
| 2010/0143156 | A1 | | 6/2010 | Kong |

FOREIGN PATENT DOCUMENTS

| | | |
|---|---|---|
| JP | 2002-147597 A | 5/2002 |
| KR | 10-2012-0105393 A | 9/2012 |

* cited by examiner

*Primary Examiner* — Edwin A Young
(74) *Attorney, Agent, or Firm* — Mintz Levin Cohn Ferris Glovsky and Popeo, P.C.; Peter F. Corless

(57) ABSTRACT

A failsafe device for a vehicle is provided that includes a transmission of a vehicle and a controller configured to operate an oil supply unit and an emergency oil supply unit. The oil supply unit supplies oil to the transmission via a first oil channel and produces hydraulic pressure and the emergency oil supply unit supplies oil to the transmission via a second oil channel and produces the hydraulic pressure when an oil supply system fails.

18 Claims, 3 Drawing Sheets

FAILSAFE DEVICE AND CONTROL METHOD FOR VEHICLE

CROSS-REFERENCE TO RELATED APPLICATION

This application claims under 35 U.S.C. §119(a) the benefit of priority to Korean Patent Application No. 10-2013-0056605 filed on May 20, 2013, the entire content of which are incorporated herein by reference.

BACKGROUND (a) Technical Field

The present disclosure relates to an environmental-friendly vehicle, and more particularly, to a failsafe device and a control method for a vehicle, through which a vehicle can drive on a limp home mode by producing temporally hydraulic pressure when an oil supply device and surrounding systems fail.

(b) Background Art

Generally, various ways have been used for supplying engine oil to an automatic transmission. In an existing vehicle of an internal combustion engine, a mechanical oil pump is operated by engine power to supply oil to the automatic transmission and to produce a predetermined oil pressure, thereby enabling shift. For a hybrid vehicle driven with a motor and engine power, a mechanical oil pump driven with engine power and an electric oil pump driven with a motor are connected in series wherein a proper hydraulic pressure is produced to operate the mechanical oil pump when a vehicle is driven with engine power, and the electric oil pump operates when the vehicle is driven with a motor, thereby enabling shift.

However, the electric oil pump may not be used when the oil pump and oil supply system fail, and thus the mechanical oil pump is driven using a motor to produce and maintain oil pressure, thereby enabling a minimum driving of a vehicle. This function refers to as a failsafe in which a safe device operates to prevent an accident even when a part of some apparatus or systems has failed or is mal-operated. Additionally, a limp home driving generally refers to an emergent driving in which the mechanical oil pump is driven to fix generally refers to an emergent driving in which the mechanical oil pump is driven to fix shifting stage when the electric oil pump fails, and which enables at least minimum driving for the vehicle to arrive at a repair location.

This limp home driving has been disclosed in the related art. Specifically, a limp home control method for a hybrid vehicle has been disclosed for a hybrid vehicle that uses a mechanical oil pump and an electric oil pump simultaneously, when the electric oil pump and the surrounding systems fail, hydraulic pressure is produced temporally using a motor to drive a vehicle.

FIG. 1 is an exemplary diagram showing a failsafe device for a vehicle according to a related art wherein a mechanical oil pump 50 and an electric oil pump 40 are connected to a transmission 10 via the respective oil channels to provide hydraulic pressure necessary for the transmission 10 based on the control of an oil pump controller (OPU) 30 that is operated by a transmission controller (TCU) 20, and when the electric oil pump 40 fails, the mechanical oil pump 50 supplies oil to the transmission 10, to provide the necessary oil pressure.

However, the mechanical oil pump is not installed to decrease structure and weight of a vehicle to improve fuel ratio and it converts into a system in which only the electric oil pump is driven wherein when the electric oil pump and the oil pump controller fail, the necessary hydraulic pressure is not provided to the transmission thus preventing the vehicle from being driven.

The description provided above as a related art of the present invention is just for helping understanding the background of the present invention and should not be construed as being included in the related art known by those skilled in the art.

SUMMARY

The present invention provides a failsafe device and a control method through which a vehicle may drive in a limp home mode when the electric oil pump fails while fuel ratio may be improved, by omitting installation of the mechanical oil pump.

Specifically, the present invention provides a failsafe device for a vehicle, including: a transmission of a vehicle; an oil supply unit that supplies oil to the transmission via a first oil channel and produces hydraulic pressure; an emergency oil supply unit that supplies oil to the transmission via a second oil channel and produces the hydraulic pressure in response to an oil supply system failure; a first controller that operates the oil supply unit when the oil supply system operates normally (e.g., no failure occurs) and operates the emergency oil supply unit when the oil supply system fails; and a second controller that operates the transmission and the first controller when the oil supply system operates normally and operates the emergency oil supply unit when the oil supply system fails.

The emergency oil supply unit may be formed integrally with the transmission wherein a predetermined amount of oil may be compressed and stored therein to produce a hydraulic pressure of a predetermined level when the oil supply system fails.

The first oil channel and the second oil channel may further include a variable valve that opens and closes the first oil channel and the second oil channel alternately based on signals from the first controller or the second controller wherein a main oil channel may be formed along from a rear of the variable valve to the transmission to cause the oil supplied via the first oil channel or the second oil channel to be supplied to the transmission via the main oil channel.

The variable valve may supply oil to the transmission from the oil supply unit by opening the first oil channel and closing the second oil channel using the first controller, when the oil supply system operates normally. In addition, the variable valve may supply oil to the transmission from the emergency oil supply unit by opening the second oil channel and closing the first oil channel using the second controller, when the oil supply system fails.

In addition, the present invention provides a control method of a failsafe device for a vehicle, including: detecting whether an oil supply system has fails; and fail-safing to supply oil to a transmission from an emergency oil supply unit by opening a second oil channel, in response to detecting an oil supply system failure. In addition, an oil supply unit failure or a first controller failure may be detected. A second controller may operate an emergency oil supply unit and a variable valve to supply oil to a transmission from the emergency oil supply unit by opening a second oil channel, in response to detecting failure of the first controller. The first controller may operate an emergency oil supply unit and a variable valve to supply oil to a transmission from the emergency oil supply unit by opening the second oil channel, in response to detect failure of the oil supply unit.

The fail-safing step may further include driving in a limp home mode, operating a vehicle to drive in the limp home mode by fixing the shifting stages when the oil from the emergency oil supply unit is supplied to the transmission. The driving in the limp home mode may be performed by maintaining a vehicle's speed at a predetermined level or less, driving the vehicle using only a motor, and when the vehicle's speed is a predetermined level or greater, the vehicle may be driven using a motor and an engine.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
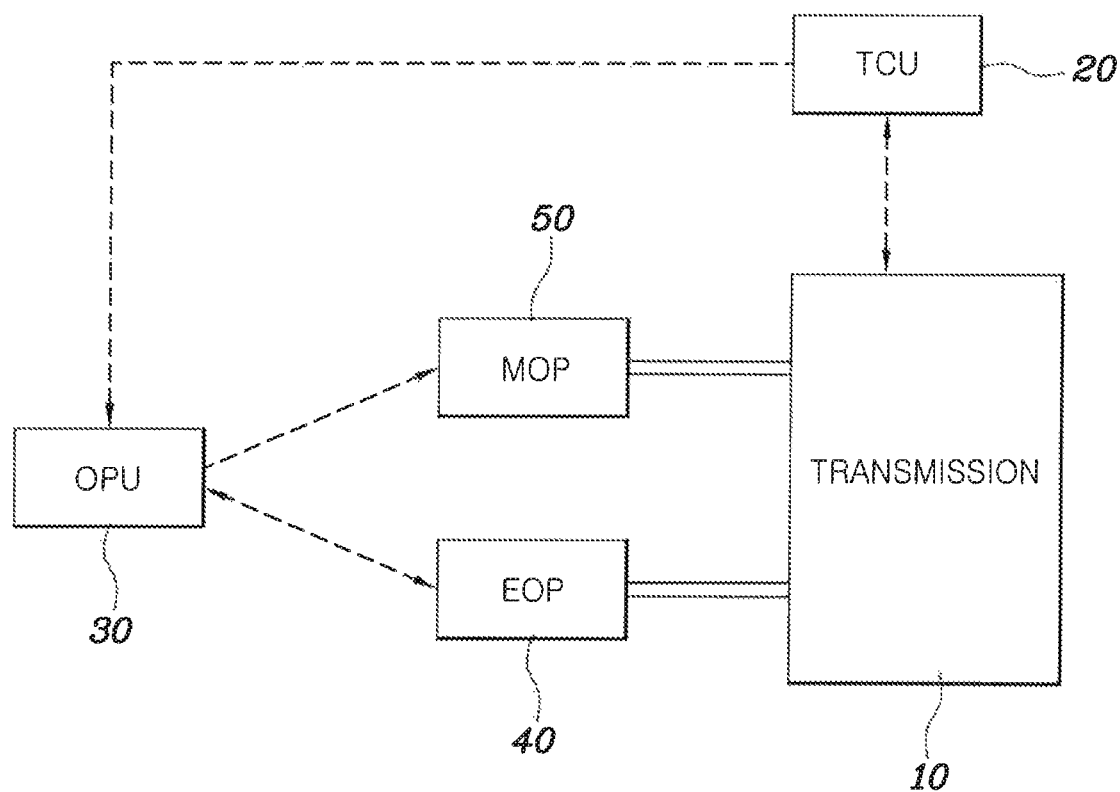
FIG. 1 is an exempla diagram showing a failsafe device for a vehicle according to a related art.

It should be understood that the accompanying drawings are not necessarily to scale, presenting a somewhat simplified representation of various exemplary features illustrative of the basic principles of the invention. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a failsafe device for a vehicle and a control method thereof will be described, referring to the accompanying drawings.

Figure 2:
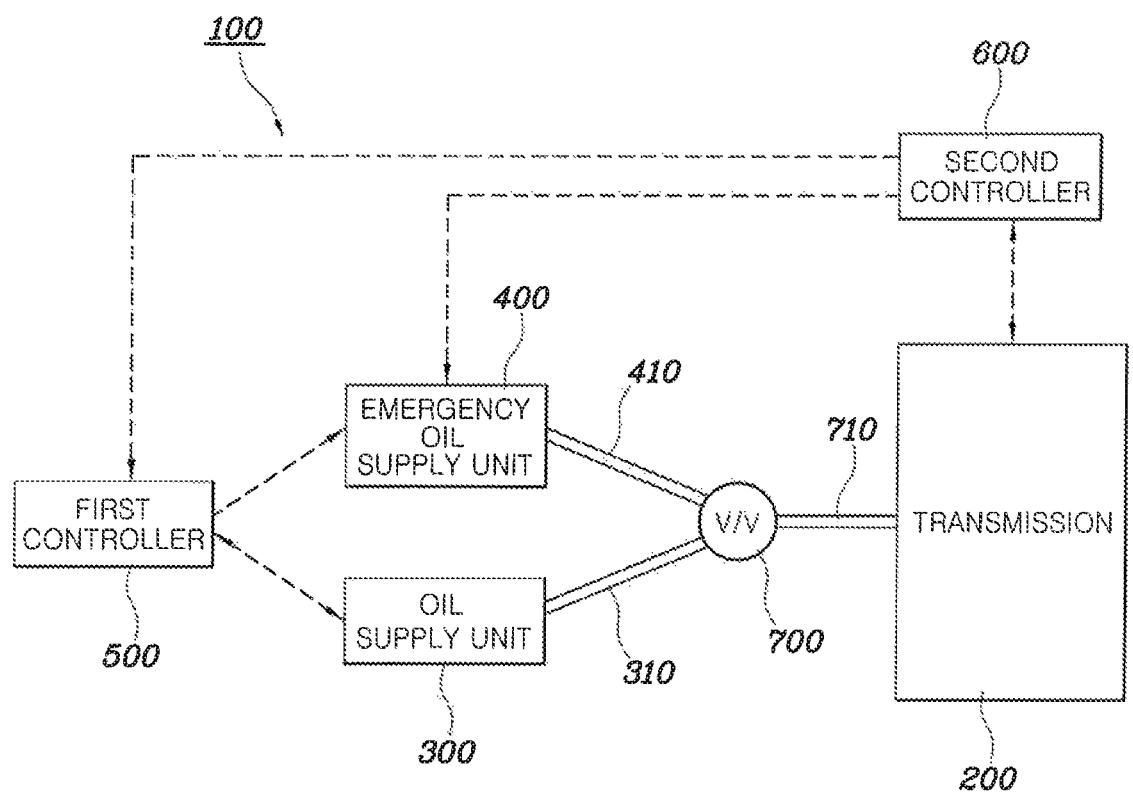
FIG. 2 is an exemplary diagram showing a failsafe device for a vehicle according to an exemplary embodiment of the present invention.

FIG. 2 is an exemplary diagram showing a failsafe device for a vehicle according to an exemplary embodiment of the present invention. As shown in FIG. 2, a failsafe device for a vehicle according to an exemplary embodiment of the present invention may include: a transmission 200; an oil supply unit 300 configured to produce hydraulic pressure by supplying oil to the transmission 200 via a first oil channel 310; an emergency oil supply unit 400 configured to produce the hydraulic pressure by supplying oil to the transmission 200 via a second oil channel 410 when an oil supply system 100 fails; a first controller 500 configured to operate the oil supply unit 300 at a normal operation and operate the emergency oil supply unit 400 when the oil supply system 100 fails; and a second controller 600 configured to operate the transmission 200 and the first controller 500 at a normal operation and operate the emergency oil supply unit 400 when the oil supply system 100 fails.

Herein, it is understood that the oil supply unit 300 generally refers to an electric oil pump (EOP), the first controller 500 refers to an oil pump control unit, the second controller 600 refers to a transmission control unit (TCU), and the transmission 200 refers to an auto transmission. Further, the first controller 500 and the second controller 600 may be integrated into a single unit in accordance with a design thereof.

The oil supply unit 300 may be configured to pump oil in an oil tank (not shown) by producing a predetermined hydraulic pressure to provide the oil to the transmission 200 while the oil supply system 100 operates normally (e.g., has not experienced a failure or malfunction) to perform a proper shift with an operation of an accelerator pedal by a driver within the transmission 200 based on a velocity of a vehicle.

The emergency oil supply unit 400 may be disposed within or extraneous to the transmission 200 and may be formed integrally with the transmission 200 wherein a separate pump for storing simply oil is not provided as an oil storage. However, since the emergency oil supply unit 400 is provided to prepare a situation where hydraulic pressure at a predetermined level is not provided from the oil supply unit 300, and the emergency oil supply unit may be configured to compress a necessary amount of oil an emergency and may store the oil.

In addition, oil maintained at a predetermined pressure within the oil supply system 100 that forms a closed loop may be to be supplied to the transmission 200 when the oil supply system 100 fails.

As described above, under the failsafe device according to the present invention, even when the oil supply system 100 fails, an unstable driving caused by not supplying oil to the transmission 200 may be prevented in advance. Further, a limp home driving may be possible by fixing the shift stages and continuously supplying hydraulic pressure at a predetermined level to the transmission 200 for a minimum driving (e.g., to be able to drive to a repair station or the like). Accordingly, a sudden stop of a vehicle on a road during may be prevented when the oil supply system has suddenly failed, thereby protecting a driver from a potential accident.

Additionally, the first oil channel 310 and the second oil channel 410 may further include a variable valve 700 that is opened and closed alternately based on signals from the first controller 500 or the second controller 600, and a main channel 710 may be formed along from a rear of the variable valve 700 to the transmission 200 to cause the oil supplied via the first oil channel 310 or the second oil channel 410 to be supplied to the transmission 200 via the main channel 710. In other words, the variable valve 700 may by close while one of the first oil channel 310 and the second oil channel 410 remains open, and the variable valve 700 may be opened by one of two oil channels based on whether the oil supply system 100 is in a normal state or in an abnormal state (e.g., whether or not failure is detected).

When the oil supply system 100 operates normally, the first controller 500 may be configured to operate the variable valve 700 based on a signal from the second controller 600 to allow the first oil channel 310 to be opened wherein the oil with a proper pressure formed via the oil supply unit 300 may be supplied to the transmission 200 via the main channel 710. In addition, the second oil channel 410 may be closed and thus oil may not flow out of the emergency oil supply unit 400.

However, when the oil supply unit 300 of the oil supply system 100 fails, the first controller 500 may be configured to operate the emergency oil supply unit 400 and the variable valve 700 may open the second oil channel 410 that has been closed and may close the first oil channel 310 that has been opened. Accordingly, oil supply from the oil supply unit 300 may be cut off and the oil that is compressed to a predetermined level in the emergency oil supply unit 400 may be supplied to the transmission 200, to enable driving in a limp home mode through which a minimum driving may be possible.

Further, when the first controller 500 in the oil supply system 100 fails, the second controller 600 may be configured to directly operate the emergency oil supply unit 400 and the variable valve 700 may open the second oil channel 410 that has been closed and may close the first oil channel 310 that has been opened. Accordingly, oil supply from the oil supply unit 300 may be cut off and the oil that is compressed to a predetermined level in the emergency oil supply unit 400 may be supplied to the transmission 200, to enable driving in a limp home mode through which a minimum driving may be possible.

When the oil supply system 100 fails, the first oil channel 310 of the oil supply unit 300 may be closed to cut off the oil supply, and the second oil channel 410 may be opened and the emergency oil supply unit 400 may be operated, enabling limp home mode driving. In particular, a vehicle may be driven with only a motor at a substantially low speed and may be driven using the motor and an engine at a substantially middle speed. Even though a standard for sorting the low speed and the middle speed may be different in accordance with designing the system, the standard is may be about 40 km/h in the present exemplary embodiment of the present invention.

According to the failsafe device for a vehicle as described above, the components may be reduced by omitting installation of the mechanical oil pump, to simplify a configuration of the failsafe device, save cost and improve fuel ratio by decreasing weight of the vehicle.

Further, even though any one of an electric oil supply pump (e.g., oil supply device) and an oil pump controller (e.g., first controller) of an oil supply system fails, since the oil pump controller and a shift controller (e.g., second controller) dually operate the emergency oil supply unit to perform stronger fail safe function, a driver may be protected from various accidents and risk that a vehicle is stopped suddenly during a driving, etc., due to a sudden failure of the oil supply system.

Figure 3:
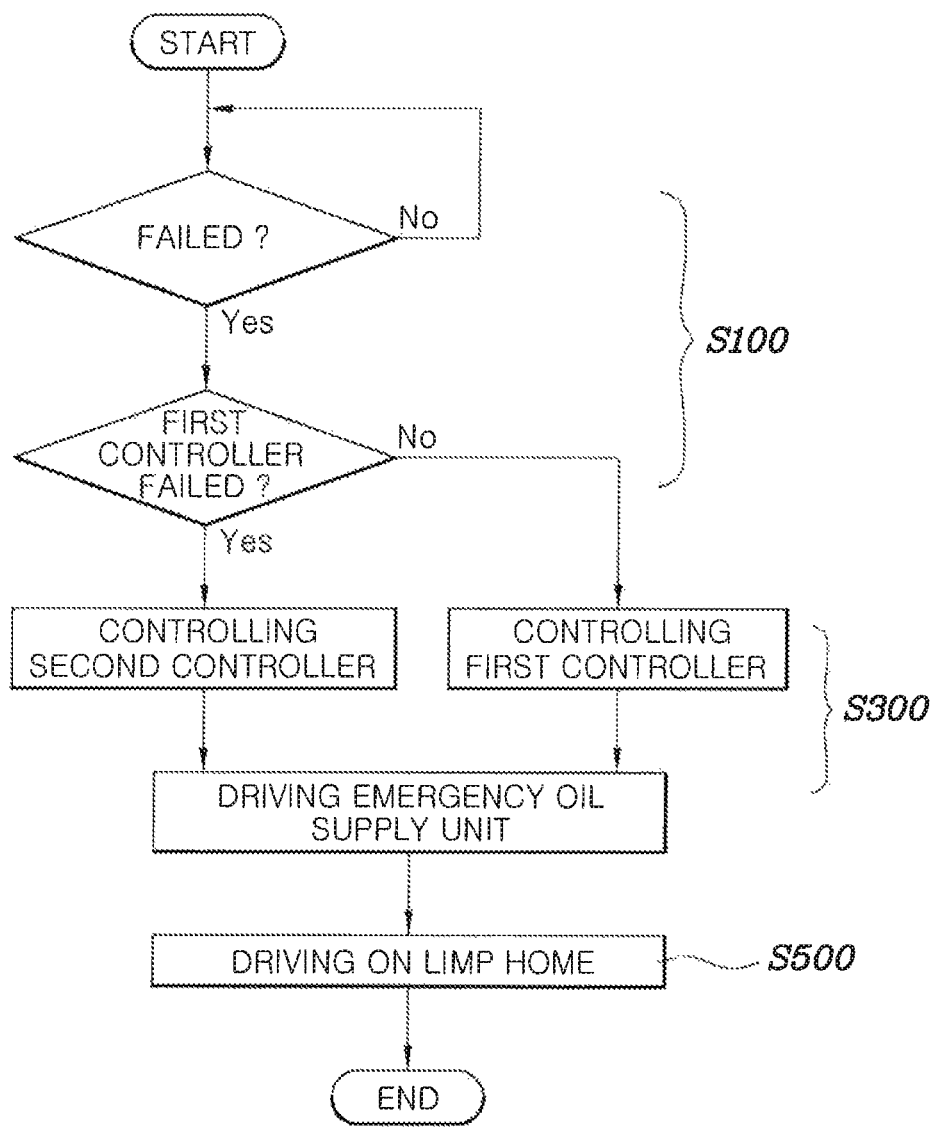
FIG. 3 is an exemplary block diagram showing a control method of a failsafe device for a vehicle according to an exemplary embodiment of the present invention.

FIG. 3 is an exemplary block diagram showing a control method of a failsafe device for a vehicle according to an exemplary embodiment of the present invention wherein the control method may include: detecting, by a controller, whether an oil supply system 100 has failed S100; and failsafing, by the controller, the oil supply system by opening a second oil channel 410 and supplying oil from an emergency oil supply unit 400 to a transmission 200 in response to detecting the oil supply system 100 failure S300. In addition, the controller may be configured to detect whether the oil supply system 100 has failed. In response to detecting that the oil supply system has not failed, the controller may be configured to continuously detect in real time whether the oil supply system has failed. Furthermore, the controller may be configured to detect whether any parts of the oil supply system 100 have failed.

In response to detecting that an oil pump unit has failed, the controller may be configured to operate the emergency oil supply unit 400 and the variable valve 700 to cut off the first oil channel 310 and open the second oil channel 410 to supply the oil compressed to a predetermined pressure in the emergency oil supply unit 400 to the transmission 200 via the main oil channel 710.

Further, in response to detecting that the oil supply unit 300 has failed, the controller may be configured to operate the emergency oil supply unit 400 and the variable valve 700 to cut off the first oil channel 310 and open the second oil channel 410 to supply the oil compressed to a predetermined pressure in the emergency oil supply unit 400 to the transmission 200 via the main oil channel 710.

The fail-sating step S300 may further include driving in a limp home mode S500, operating the vehicle to drive in the limp home mode by fixing the shifting stages when the oil from the emergency oil supply unit 400 is supplied to the transmission 200. Through the fail-safing step S300, the shift stages of the transmission may be fixed while the oil compressed to a predetermined pressure in the emergency oil supply unit is supplied to the transmission via the main oil channel, by cutting off the first oil channel and opening the second oil channel. In particular, a vehicle may be driven in the limp home mode to allow a vehicle to be driven using only a motor when the vehicle's speed is a predetermined level or less, and when the vehicle's speed is a predetermined level or greater, the vehicle may be driven using the motor and an engine. Meanwhile, the predetermined level of the vehicle's speed may be different depending on a design of the system; however, in the exemplary embodiment of the present invention the vehicle speed may be about 40 km/h.

Further, even though any one of an electric oil supply pump (e.g., oil supply device) and an oil pump controller (e.g., first controller) of an oil supply system fails, since the oil pump controller and a shift controller (e.g., second controller) dually operate the emergency oil supply unit to perform stronger fail safe function, a driver a driver may be protected from various accidents and risk when a vehicle is stopped suddenly while driven, etc., due to a sudden failure of the oil supply system.

According to the failsafe device for a vehicle as configured above, the components may be reduced by omitting installation of the mechanical oil pump used in an existing hybrid vehicle, to simplify a configuration of the failsafe device, save cost and improve fuel ratio by decreasing weight of the vehicle. Further, even though any one of an electric oil supply pump and an oil pump unit of an oil supply system fails, hydraulic pressure necessary for a minimum driving may be produced using the oil stored in an emergency oil supply unit to drive in a limp home mode, and further since the emergency oil supply unit may be dually operated by a controller of a transmission and the oil pump unit, stronger fail safe function may be performed to protect a driver from various accidents due to a sudden failure of the oil supply system.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

What is claimed is:

1. A failsafe device for a vehicle, comprising:
   a transmission of the vehicle;
   a controller configured to:
      operate an oil supply unit to supply oil to the transmission via a first oil channel and produce hydraulic pressure; and
      operate an emergency oil supply unit to supply oil to the transmission via a second oil channel, produce the hydraulic pressure when an oil supply system fails, and store a necessary amount of oil previously compressed for an emergency as an oil storage.

2. The failsafe device for a vehicle of claim 1, wherein the emergency oil supply unit is formed integrally with the transmission the compressed oil is stored therein to produce a hydraulic pressure of a predetermined level when the oil supply unit fails.

3. The failsafe device for a vehicle of claim 1, wherein the first oil channel and the second oil channel further include:
   a variable valve configured to alternately open and close the first oil channel and the second oil channel based on control signals,
   wherein a main oil channel is formed along from a rear of the variable valve to the transmission to cause the oil supplied via the first oil channel or the second oil channel to be supplied to the transmission via the main oil channel.

4. The failsafe device for a vehicle of claim 3, wherein the variable valve supplies oil to the transmission from the oil supply unit by opening the first oil channel and closing the second oil channel by the controller, when the oil supply system operates normally.

5. The failsafe device for a vehicle of claim 3, wherein the variable valve supplies oil to the transmission from the emergency oil supply unit by opening the second oil channel and closing the first oil channel by the controller, when the oil supply system fails.

6. A control method of a failsafe device for a vehicle, comprising:
   detecting, by a controller, whether an oil supply system has failed;
   in response to detecting oil supply system failure, fail-safing, by the controller, to supply oil to a transmission from an emergency oil supply unit by opening an oil channel: and
   storing, by the controller, a necessary amount of oil previously compressed for an emergency as an oil storage.

7. The control method of a failsafe device for a vehicle of claim 6, further comprising:
   detecting, by the controller, failure of the oil supply unit.

8. The control method of a failsafe device for a vehicle of claim 7, further comprising:
   in response to detecting oil supply unit failure, operating, by the controller, the emergency oil supply unit and a variable valve to supply oil to the transmission from the emergency oil supply unit by opening the oil channel.

9. The control method of a failsafe device for a vehicle of claim 7, further comprising:
   in response to detecting the oil supply unit failure, operating, by the controller, the emergency oil supply unit and a variable valve to supply oil to the transmission from the emergency oil supply unit by opening the oil channel in the fail-safing step.

10. The control method of a failsafe device for a vehicle of claim 6, wherein fail-safing further includes:
    operating, by the controller, a limp home mode by fixing shifting stages when the oil from the emergency oil supply unit is supplied to the transmission.

11. The control method of a failsafe device for a vehicle of claim 10, further comprising:
    when a vehicle's speed is a predetermined level or less, operating, by the controller, the vehicle to be driven using a motor; and
    when the vehicle's speed is the predetermined level or greater, operating, by the controller, the vehicle to be driven using the motor and an engine.

12. A non-transitory computer readable medium containing program instructions executed by a controller, the computer readable medium comprising:
    program instructions that detect whether an oil supply system has failed;
    program instructions that fail-safe to supply oil to a transmission from an emergency oil supply unit by opening an oil channel in response to detecting oil supply system failure; and
    program instructions that store a necessary amount of oil previously compressed for an emergency as an oil storage.

13. The non-transitory computer readable medium of claim 12, further comprising:
    program instructions that detect failure of the oil supply unit.

14. The non-transitory computer readable medium of claim 13, further comprising:
    program instructions that operate the emergency oil supply unit and a variable valve to supply oil to the transmission from the emergency oil supply unit by opening the oil channel in response to detecting oil supply unit failure.

15. The non-transitory computer readable medium of claim 13, further comprising:
    program instructions that operate the emergency oil supply unit and a variable valve to supply oil to the transmission from the emergency oil supply unit by opening the second oil channel during the fail-safe process in response to detecting the oil supply unit failure.

16. The non-transitory computer readable medium of claim 12, further comprising:
program instructions that operate a limp home mode by fixing shifting stages when the oil from the emergency oil supply unit is supplied to the transmission.

17. The non-transitory computer readable medium of claim 16, further comprising:
program instructions that operate the vehicle to be driven using a motor when a vehicle's speed is a predetermined level or less; and
program instructions that operate the vehicle to be driven using the motor and an engine when the vehicle's speed is the predetermined level or greater.

18. A failsafe device for a vehicle, comprising:
a transmission of the vehicle
an oil supply unit that supplies oil to the transmission;
an emergency oil supply unit that supplies oil to the transmission; and
a controller configured to:
operate the oil supply to unit supply oil to the transmission via a first oil channel and produce hydraulic pressure; and
operate the emergency oil supply unit to supply oil to the transmission via a second oil channel, produce the hydraulic pressure when an oil supply system fails, and store a necessary amount of oil previously compressed for an emergency as an oil storage.

* * * * *